Oct. 7, 1969

G. BESTHORNE 3,470,923

ADJUSTABLE DUAL BLADE NOTCHING SAW

Filed Sept. 12, 1967

INVENTOR.
GERARD BESTHORNE
BY

ATTORNEY

United States Patent Office 3,470,923
Patented Oct. 7, 1969

3,470,923
ADJUSTABLE DUAL BLADE NOTCHING SAW
Gerard Besthorne, 29A Wavecrest Ave.,
Winfield Park, N.J.
Filed Sept. 12, 1967, Ser. No. 667,234
Int. Cl. B27b 33/02
U.S. Cl. 143—133                                    8 Claims

ABSTRACT OF THE DISCLOSURE

This invention relates to a dual blade notching saw for cutting notches in joists, beams, panels, and the like. More specifically, it deals with a dual notching saw having a forward reinforcing cross member which is adjustable for positioning to an upper or lower location at the forward end of the saw blades. Such member is preferably a bolt which may be moved in a slot in each of the saw ends, and is lockable at each end of the slot. A coil spring disposed around said bolt serves to keep the saw blade ends rigidly against the bolt heads.

Background of the invention

At the present time, particularly during the renovation of buildings, new electrical conduits or cables and plumbing pipes, to be installed, must be recessed into existing panels, joists or beams. This is generally done with a portable electrical hacksaw provided with a single protruding reciprocating saw blade. One notch is first made and another is made parallel to the first at a distance adequate to permit entry of the conduit or cable. Thereafter, the notched portion is chipped or knocked out for insertion of the conduit or cable into the open portion. A staple driven astride the opening serves to hold the conduit or cable therein.

It would appear that a dual blade saw would reduce the cutting time for such notches by one half. However, such saws have not appeared on the market. A dual blade saw has been proposed in Patent No. 1,380,814 and provision was made therein to make adjustable the lateral distance between the two saw-kerfs. However, such a saw would be inapplicable for the uses herein set forth.

In Patent No. 1,627,622, a hand-operated dual blade saw was proposed for the notching of joists, beams, and the like. This saw had a permanent connection at the saw ends which also would make the saw unfit for entering panels, for example, even if it were provided with an electrical driving means.

Summary of the invention

According to the present invention, a dual blade saw is provided with forward reinforcing means which is adjustable so that, when a panel is to be penetrated with the sharp ends of the blades, the reinforcing member may be moved rearwardly and locked in position so as to allow enough forward room for the blades to penetrate a wall or sheetrock panel, or the like, so as to enable the immediate cutting of a slot therein.

In the event a wide beam or joist is to be notched, the reinforcing member may be moved forwardly and locked in place, thus providing adequate room for reciprocation required in the cutting of the notch.

The preferred reinforcing member is a two-headed bolt passing through parallel-disposed holes in the blades, the bolt heads serving as outward limiting means for the blades. Diagonally-directed parallel slots are provided in the blades in which the bolt is designed to ride for position adjustment thereof. It is also desirable to have the bolt, or shoulders thereon adjacent said bolt heads, in shaped form to fit similarly-shaped slot ends, so as to enable the locking of the bolt in either end position in the slots. A helical spring disposed around the bolt between the blades serves to press the blades rigidly against the bolt heads.

Brief description of drawing

The invention will be more readily understood by reference to the accompanying drawing, in which a preferred embodiment is described, and in which.

The same numerals refer to similar parts in the various figures.

Description of the preferred embodiment

Figure 1:
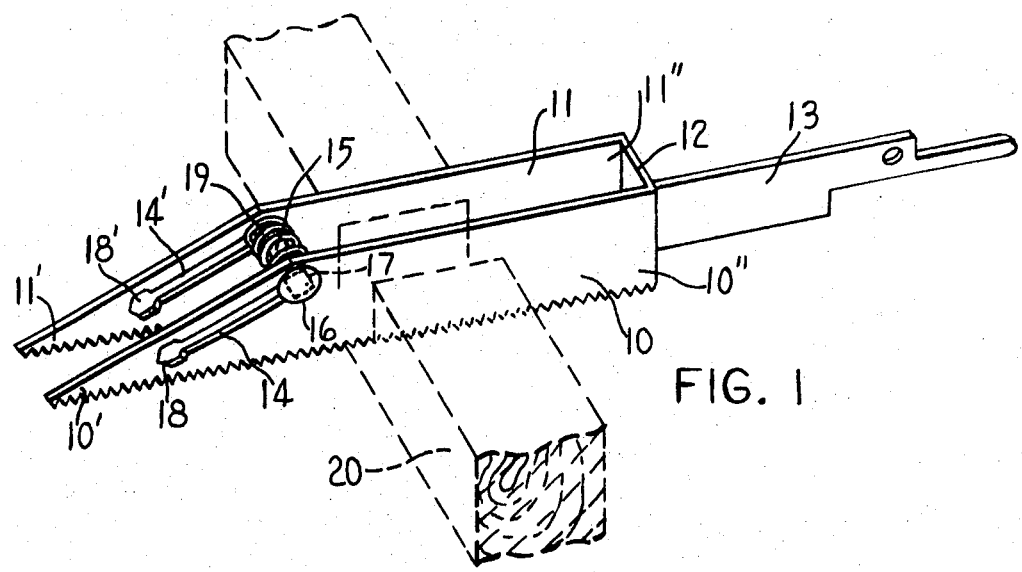
FIGURE 1 depicts a perspective side elevational view of a preferred dual blade notching saw of the present invention, with the reinforcement member in upper position.

Referring again to the drawing, numeral 10 refers to one saw blade having sharp forward end 10', and a squared off rear end 10". A second saw blade 11 is disposed in spaced relation and parallel to saw blade 10. It also has sharp forward end 11' and squared off rear end 11". Both blades are connected at the rear with crosspiece 12, to which is attached the motor-connecting member 13, which is inserted into the reciprocating clamp of a conventional electrically operated power tool such as a "Sawzall" (not shown). Such tools and sabre saws used therewith are made by Black & Decker Mfg. Co., and Milwaukee Electric Tool Corporation, as well as by other manufacturers. Blades 10 and 11 have their sharp forward ends 10' and 11', respectively, slant downwardly at an acute angle with respect to the bodies of the blades.

Each blade has cut into it an upwardly-directed diagonal slot 14 and 14', respectively, these slots being disposed parallel to each other. In these slots is disposed bolt 15 having heads 16 and 16' which have dimensions larger than the widths of the entire slots 14 and 14', respectively. The body, or else a shoulder 17 adjacent each of the bolt heads, of bolt 15 is desirably shaped in square or hexagonal cross-section, and the ends 18 and 18', as well as the other ends of slots 14 and 14', respectively, are similarly shaped so as to enable shaped portions 17 to seat therein and become locked therein. A helical spring 19 is disposed around bolt 15 between blades 10 and 11, and it impresses an outward thrust so as to hold the blades rigidly against the bolt heads.

When the reinforcing member 15 is in the upper position shown in FIG. 1, the dual saw can be used to cut a notch in joist 20, for example. Or, sharp tips 10' and 11' can be jabbed through a plaster board, for example, and there is enough room from tips 10'–11' to bolt 15 to enable reciprocation of the blades to produce a cut slot in the board.

Figure 2:
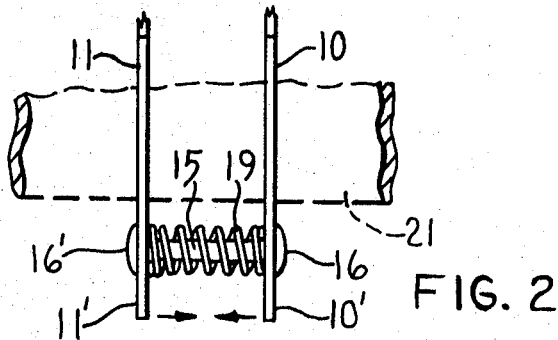
FIGURE 2 shows a front elevational view of the same saw, with the rear portion thereof cut away, and with the reinforcement member in lower position.

When the reinforcing member is to be moved to the lower position, as in FIG. 2, the two saw tips 10'–11' are pressed toward each other, as indicated by the arrows, at which time spring 19 becomes compressed so as to free bolt 15. The latter then is moved out of its locked position in the upper ends of grooves 14–14', and is slid down into locking position in the lower groove ends 18–18', whereupon the finger pressure is relieved, and the reinforcing means is locked into its lower position. It will be noted that when the reinforcing member is in this position, there is more room between it and the rear ends 10"–11" of the blades, which makes it easier to cut beams and wider joists, such as wide joist 21. Also, it is possible to penetrate the dual blade into joist areas deeper than the depth of the joist, without bumping bolt 15 against the side of the joist, due to the forward position of bolt 15.

From the aforesaid description, it is readily apparent that the saw of the present invention effects a considerable saving in time over present single blade saws. Also, it makes adjustment of the reinforcing agent relatively simple eliminating the need for tools or otherwise excessively protruding elements.

I claim:
1. A dual blade notching saw, of the type described, comprising:
   a pair of spaced, parallel saw blades having sharp forward ends and a connecting member at the rear ends, said connecting member having attached thereto insertion means into a power tool, and
   a reinforcing cross member disposed between the blades at their forward ends and movable to positions close to the forward ends or further rearwardly on said blades.
2. A dual blade notching saw, according to claim 1, in which said reinforcing cross member is lockable in each of said positions.
3. A dual blade notching saw, according to claim 1, in which each blade has a laterally-directed slot cut into the forward end of each blade, in parallel relation, and
   a reinforcing cross member disposed between said blades and designed to be slid either into forward or rearward position in said slots.
4. A dual blade notching saw, according to claim 3, in which said cross member is lockable in either said forward or rearward positions.
5. A dual blade notching saw, according to claim 2, in which the slots are cut to slant upwardly in rearward direction.
6. A dual blade notching saw, according to claim 2, in which the reinforcing member is a bolt having a head on each end wider than said slots, said heads being disposed outside of said blades.
7. A dual blade notching saw, according to claim 4, in which a spring is disposed around said bolt between said blades, with spring pressure exerted to press said blades against said bolt heads.
8. A dual blade notching saw, according to claim 5, in which said bolt adjacent the saw blades has a shaped cross-section, and said slots have ends of complementary shape serving to accommodate said bolt into locking position at said slot ends.

References Cited
UNITED STATES PATENTS 1,380,814    6/1921    Lindsay.
782,121    2/1905    Foreman.

DONALD R. SCHRAN, Primary Examiner

U.S. Cl. X.R.

145—31